United States Patent [19]

Twist et al.

[11] Patent Number: 4,733,016

[45] Date of Patent: Mar. 22, 1988

[54] TRANSIT FOR CABLES AND PIPES

[75] Inventors: Michael Twist, Davyhulme; Alan Platt, Denton, both of England

[73] Assignee: Hawke Cable Glands Limited, Staffordshire, England

[21] Appl. No.: 9,943

[22] Filed: Feb. 2, 1987

[30] Foreign Application Priority Data

Feb. 11, 1986 [GB] United Kingdom ............... 8603369

[51] Int. Cl.$^4$ .................................. H02G 3/18
[52] U.S. Cl. ..................... 174/65 R; 248/56; 361/428
[58] Field of Search ............... 174/48, 151, 65 R, 49, 174/35 R, 35 MS; 248/56; 361/424, 428, 429, 331

[56] References Cited

U.S. PATENT DOCUMENTS

| | | | |
|---|---|---|---|
| 2,732,226 | 1/1956 | Brattbers | 248/56 |
| 4,249,353 | 2/1981 | Berry | 248/56 |
| 4,262,166 | 4/1981 | Rudzishevsky | 174/65 R |
| 4,291,195 | 9/1981 | Blomquist | 248/56 |
| 4,358,632 | 11/1982 | Buch | 174/35 MS |

FOREIGN PATENT DOCUMENTS 1049621 11/1966 United Kingdom .

Primary Examiner—G. P. Tolin
Attorney, Agent, or Firm—Larson and Taylor

[57] ABSTRACT

In a lead-through transit for cables or pipes 3 of the kind in which a series of modular resilient blocks 4 or blanks 5 are mounted in a frame 1 through which the cables 3 extend, the invention is directed to the compression and packer assembly 7 by which the opening through the frame 1 is closed and pressure applied to the assembled cables 3, blocks 4 and blanks 5 with stayplates 6 between each row of blocks. The compression and packer assembly 7 comprises a rigid plate 8 which seats on the assembled blocks 4 and blanks 5 for engagement by a compression bolt 33 mounted on the frame 1 to apply a load to the plate 8. Three resilient packer blocks 9,10 and 11 are arranged to be inserted between the plate 8 and frame 1 with two of the blocks 9,11 being for insertion on either side of the bolt 33 and having respective distance members as rods 28 to limit the reactive effect of the assembled blocks 4 and blanks 5 with cables 3 so that the compression bolt 33 can be displaced clear of the center of the frame 1 to leave a clearance spaced into which the center packer block 10 is inserted. Each packer block 9,10 and 11 has an associated compressor stud 12,13 and 14 which acts to compress it's block thereby expanding the packer blocks into tight sealing engagement between and with the plate 8 and the frame 1. The arrangement of the compression and packer assembly ensures improved sealing of the transit and is simpler to handle and assemble than prior arrangements.

12 Claims, 11 Drawing Figures

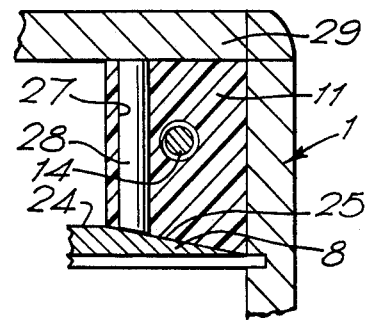
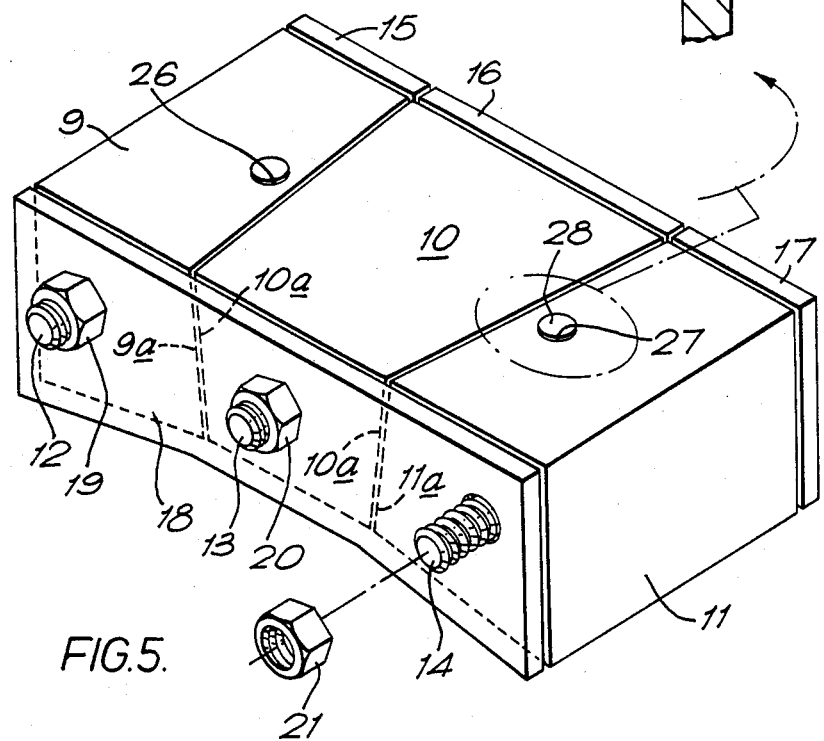

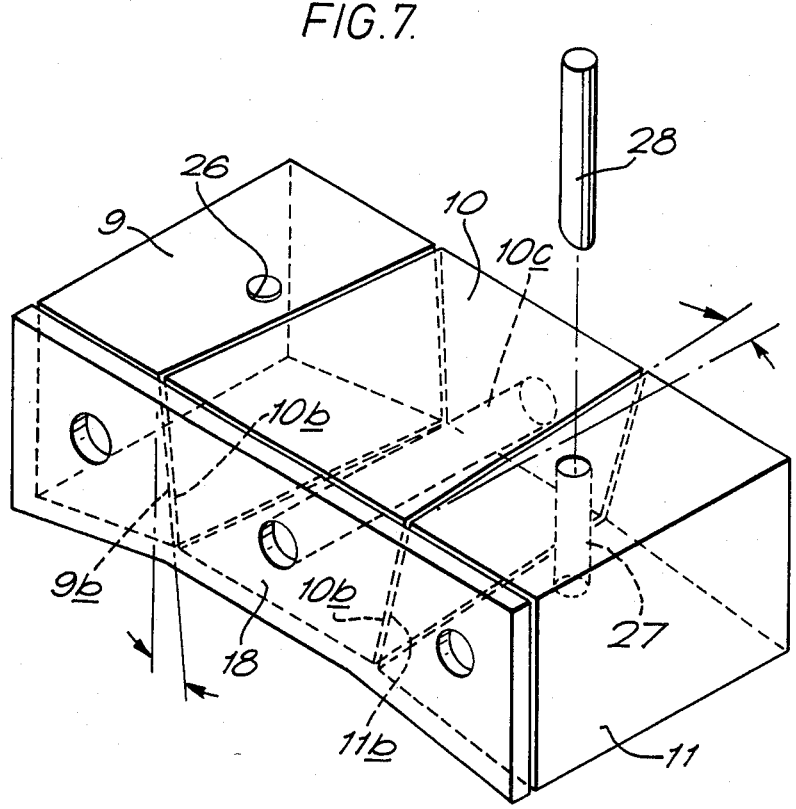

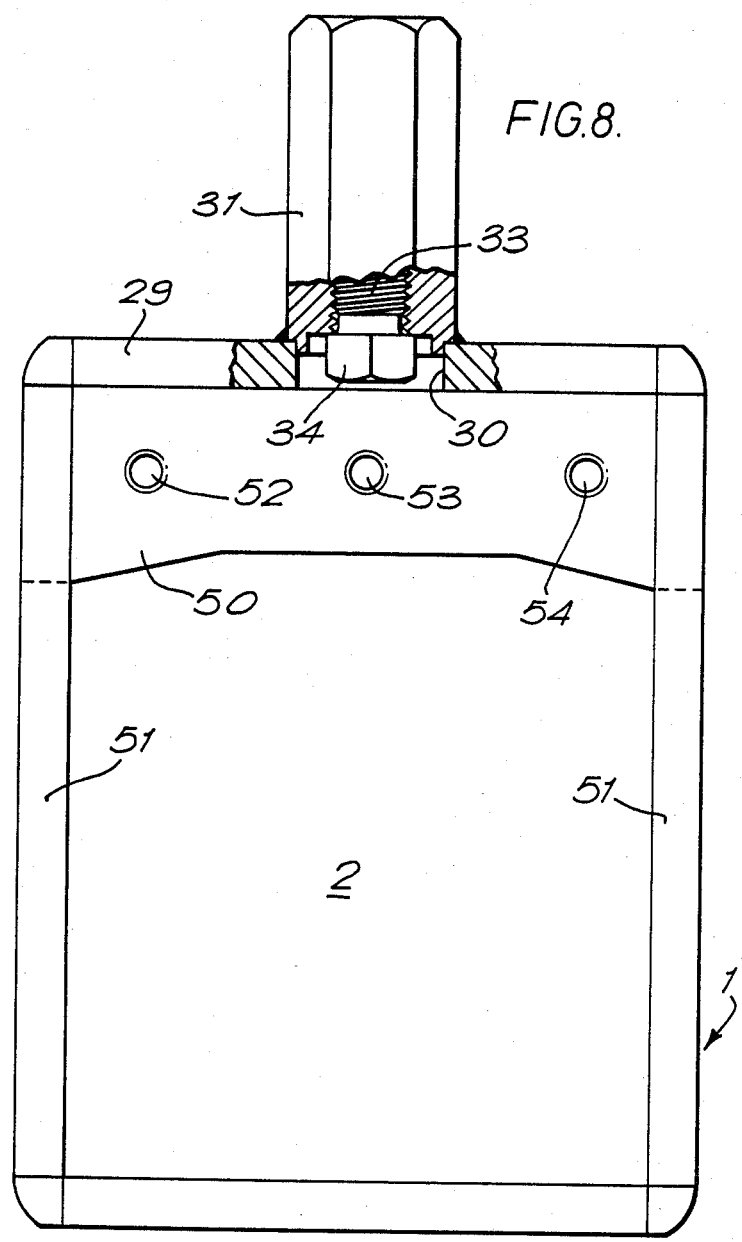

TRANSIT FOR CABLES AND PIPES

BACKGROUND OF THE INVENTION

This invention relates to a transit providing a lead-through for electric cables or pipes that are required to extend through an opening in a wall, bulkhead, partition or the like. This invention concerns certain improvements in a particular kind of transit as hereinafter defined and which is for use with cables, wires, pipes or tubes or the like elongate elements commonly used in an installation for conducting electricity, service commodities such as gas, oil or water, or enclosing such service lines. For convenience herein, the term "cable" is used and should be interpreted in the context to include all such aforesaid elongate elements.

This invention is particularly concerned with a transit of the kind now defined as comprising a rectangular metal frame defining an opening through which the cables are to extend, a series of sets of modular blocks for assembly in rows within the frame opening, the blocks being adapted for surrounding each cable or for blanking off a modular space, and a compression and packer assembly for mounting in the frame opening to clamp the assembled blocks together and around each cable with the compression and packer assembly completing filling of the frame opening.

Such defined kind of transit for cables is well known and is disclosed in patent specification GB No. 1,049,621.

Typically, transits of the defined kind are used in a wide range of applications and are installed in various environments including hazardous and have to meet specific regulations for fire-proof or flame-proof or gas-tight installations. Usually, a transit has to be assembled on site and often the working conditions at the installation site are difficult in many respects, such as: access and location; the numbers, types and sizes of cable; limited working space and lack of access to both inlet and exit sides of the lead-through; and, ambient temperature, weather and environmental conditions.

Conventionally in transits of the defined kind, in each series set of the modular blocks, each block is of square section and has a length substantially the same as the depth of the metal frame into which the blocks are assembled in an array of superimposed rows. Each block in a set of blocks has the same external dimensions and a plurality of blocks from one set will completely fill one row across the inside of the frame. To provide blanks at locations in a row where no lead-through is required, each set includes solid blank blocks for assembly in the row. For a cable lead-through, the blocks have a through hole of a diameter corresponding to the diameter of the cable to be surrounded by the block, and to facilitate fitting and assembly each such block is formed in two complementary halves with semi-cylindrical recesses that, when aligned, provide the lead-through hole in which the cable is seated.

This invention as later described may be applied to transits for use with such modular blocks as just mentioned or with other forms of modular blocks used for the same purpose of providing the lead-throughs for the cables or pipes and blanking blocks for filling the modular space where no lead-through is required.

This invention is particularly concerned with the compression and packer assembly of a transit of the defined kind.

As will be understood, the compression and packer assembly is arranged to be received within the frame to fill the remaining space left after the rows of modular blocks defining the lead-throughs and blanks have been assembled. The compression and packer assembly has to apply pressure to the assembled array of modular blocks and cables to clamp these together and around the cables whilst also completely filling the frame. It is important in practice that such compression and packer assembly be simple to install and in many applications it is essential that the correct pressure is applied to the assembled array either to avoid excessive clamping forces being applied to cables which must not be stressed or deformed, for instance optic cables, or to avoid insufficient clamping forces which could lead to failure in sealing required and or ineffectual retention of the arrayed modular blocks within the frame so that the transit assembly fails to provide a complete barrier in a wall, bulkhead or the like as intended.

In the common known transits of the kind defined, the compression and packer assembly relies on the resilient deformation of a packer block or blocks which are inserted in the frame to fill the remainder of the opening after the modular blocks and cable have been assembled. Due to the inherent properties of the assembled modular blocks and cables, before the packer can be inserted, the assembled array has to be forced down into the frame to provide a clearance opening into which the packer can be inserted. Commonly, this initial compression is achieved by using a pressure plate which seats on the final row of modular blocks and a load is applied to the plate by a bolt which is mounted in an end wall of the frame and which can be unscrewed to engage the pressure plate and then on further unscrewing gradually applies the load to the assembled array of modular blocks to force them together around the cables.

Once this stage has been completed, then a packer block corresponding to the internal width of the frame and designed to seat on the plate engaging the inner faces of the side walls of the frame has to be inserted into the clearance space with the packer having a cut-out or suitable recess for the bolt which has to be left in situ maintaining the compression on the assembled array of blocks and cables whilst the packer block is so inserted. The packer block is then expanded by a squeezing action applied between front and rear faces of the packer block by a clamping arrangement, and then the forces applied to the assembly enclosed within the frame are distributed with all of the parts and the cables being subject to compression loads to maintain the desired clamping and sealing engagement. The bolt is left in situ although it is usually no longer needed to apply any compression to the array of blocks and cables as the pressure is now applied through the expanded packer block engaging the pressure plate. The cut-out or recess in the packer block may be filled by a packer piece which is either fitted onto the bolt initially or which is finally inserted when the last adjustment of the bolt is completed.

This arrangement leads to many complications on site as the main single packer block has to be entered into the clearance space from one side of the frame whilst manipulation of the bolt and any insertion of the packer piece is from the other side. In addition due to the effect of the assembled modular blocks and cables, often it is impossible to ensure that excessive and damaging pressure is not applied to the cables and modular blocks.

To overcome such disadvantages, other proposals have been made and some implemented in use by providing a combined and adjustable compression and packer assembly which can be inserted into the clearance space when in a contracted condition, and then expanded in a direction within the plane of the frame and transverse to the axes of the cables so as to apply the desired pressure to clamp the assembled modular blocks, cables and packer together tightly within the frame opening. However, even with such adjustable compression and packer assembly difficulties in practical use arise due to the need to squeeze the packer assembly into the clearance space whilst attempting to hold the arrayed modular blocks and cables in situ, and in addition, problems also arise from the uncontrolled nature of the expansion of the compression and packer assembly and the forces generated within the frame during fitting.

It is an object of this invention to provide an improved transit of the kind defined for cables or pipes which has a particular form of compression and packer assembly which is both simple and easy to use in assembly of a transit as well as obviating known disadvantages with existing transits systems such as referred to previously.

It is a further object of this invention to provide a compression and packer assembly which provides versatility for fitting and installation requirements.

Other objectives and advantageous features of this invention will be referred to later herein with particular reference to exemplary embodiments of this invention.

SUMMARY OF THE INVENTION

According to this invention, we provide a transit of the defined kind wherein the compression and packer assembly comprises:

a rigid plate for location in the frame to apply pressure to the assembled array of modular blocks and cables in a first direction which is in a plane transverse to the axes of the cables and substantially within opposed side walls of the frame between which the rows of modular blocks extend;

a compression bolt mounted in the end wall of the frame for threaded displacement in said first direction and arranged to engage the plate to apply a load to said plate and assembled array to clamp the modular blocks and cables together;

packer blocks of resilient material for insertion into the clearance space in the frame opening between said end wall and said plate to complete filling of the frame opening with the packer blocks being seated beside each other between the side walls of the frame, and the packer blocks being for adapted for insertion in a second direction which is transverse to said first direction and in a plane substantially parallel to the axes of the cables; and a respective compressor stud extending through each packer block in said second direction and arranged to apply compression to each packer block within the confines of the frame to maintain pressure on the plate and the assembled array of modular blocks and cables after the compression bolt has been displaced from engagement with said plate.

By this invention, the packer blocks are adapted to be entered separately into the clearance space between the plate once the load has been applied to the assembled array, and at least one of the packer blocks can be employed to maintain the pressure plate in the desired position whilst the pressure is relieved from the plate by displacing the bolt away from engagement with the plate. The packer blocks are to be seated beside each other between the walls of the frame in the clearance space and the bolt does not have to be left extending into such clearance space. The bolt can be removed or displaced clear of the packer blocks and no special steps are required to accommodate the compression bolt within the frame opening once the packer blocks have been placed beside each other filling the spaced between the frame end wall, the plate and the inner faces of the side walls.

Preferably, the compression and packer assembly includes a distance member which is interposed between the end wall of the frame and the plate to limit the reactive effect of the assembled modular blocks and cables on the plate on displacement of the bolt away from the plate following the insertion of at least one packer block.

By this distance member, the pressure plate can be maintained in substantially the correct position holding the modular blocks and cables in the desired position whilst the remaining packer blocks are inserted.

The distance member may comprise a pin or other rigid member located on or in a packer block and extending in said first direction. Conveniently, the distance member comprises a pin located within a bore formed in a packer block.

In the preferred form of compression and packer assembly of this invention, there are three such packer blocks. There is a central packer block and two outer or side packer blocks which are clear of the extent of the compression bolt when engaged with the plate.

By this preferred arrangement, at least one of the outer packer blocks is inserted into the clearance space between the plate and the end wall of the frame with the bolt holding the plate in position. Depending on the arrangement and type of installation, the other outer packer block can then be inserted with the compression bolt being then displaced with the plate being held in position by the outer packer blocks and any distance members. The central block may then be inserted without interference from the bolt. In some arrangements, only one outer packer block can be inserted first, then the compression bolt displaced whilst a distance member holds the plate in position, and then the central or the other outer packer block may be inserted.

The advantages and merits of this separate assembly of the packer blocks whilst maintaining the plate in controlled engagement with the array of modular blocks and cables will be appreciated as a considerable advance over the prior arrangements as previously discussed.

The packer blocks may have complementary taper faces for abutting engagement with each other on insertion of each packer block into position within the clearance space between the end wall of the frame and the plate. The taper faces may be inclined either to said first direction and/or inclined to said second direction, and these taper faces may be arranged to provide a wedge-like effect between the packer blocks.

The provision of the taper faces on the packing blocks can aid assembly of the separate blocks and also improves the distribution of compressive forces applied to the packer blocks by the compressor studs.

The compressor studs may extend through opposed support plates engaging end faces of each packer block. These support plates may be common to all of the packer blocks and extend across the frame opening with an outer clearance. One support plate may be rigidly connected to the frame. Each packer block may have a separate support plate either at one end face or at both end faces.

Various features relating to the design and construction of the frame and parts of the transit associated with the compression and packer assembly will be described later herein.

Preferably, the plate has a planar flat underside for engagement with the row of modular blocks as last assembled, but the opposed side of the plate may be curved in the manner of a bridge extending between the side walls of the frame with the packer blocks having complementary underside faces to engage the plate. Alternatively, both the plate and the underside faces of the packer blocks may be complementary and may be profiled or have inclined or tapered portions to both assist in distributing the compressive forces and other loads as well as assisting correct alignment and fitting of the parts together.

This compression and packer assembly may comprise only two packer blocks, and these can be of different widths so that one smaller packer block is inserted in the access clearance space beside the compression bolt, and thereafter a large packer block can be inserted to fill and close the clearance space following displacement of the compression bolt.

This compression and packer assembly may comprise more than three packer blocks, and the number of packer blocks employed may designed to suit the shape and configuration and dimensions of the transit frame.

Preferably, the compression bolt is mounted in the central portion of the end wall of the frame, but this is not essential provided that the bolt can be displaced to apply the desired initial pressure to the plate to hold the assembled array of modular blocks and cables in position whilst the packer block or blocks are inserted.

Other features of this invention will now be described with reference to exemplary embodiments depicted in the accompanying drawings wherein:

BRIEF DESCRIPTION OF THE DRAWINGS

FIG. 5 is an isometric detail view showing an alternative type of packer blocks and support plates;

FIG. 6 is a detail sectional view of part of the assembly shown in FIG. 5 and as indicated therein;

FIG. 7 is an isometric detail view showing another alternative type of packer blocks and a support plate;

FIG. 8 is a front elevational view of a frame having an integral support plate;

DETAILED DESCRIPTION OF THE EXEMPLARY EMBODIMENTS

Figure 1:
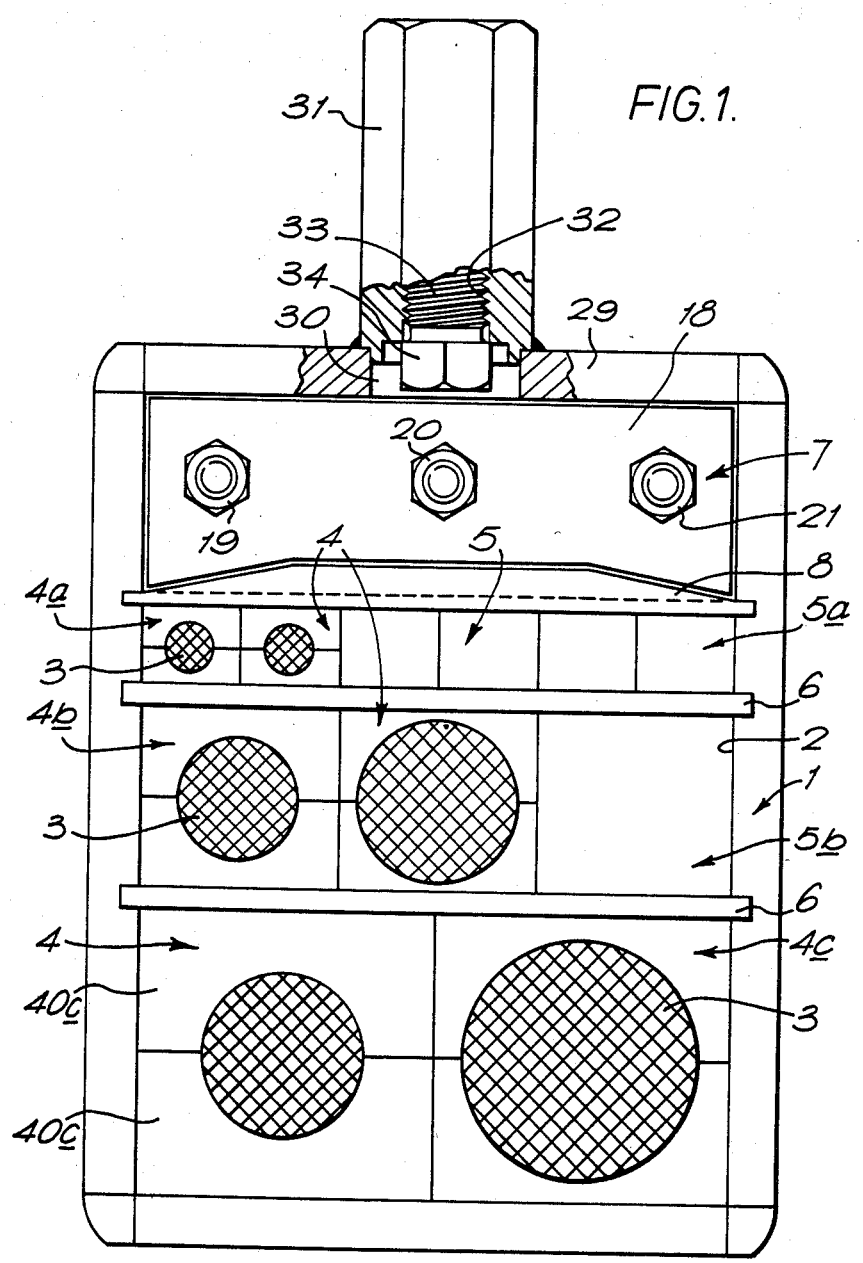
FIG. 1 is a front elevation of a cable transit according to this invention shown in the assembled condition with cables in situ.
Figure 2:
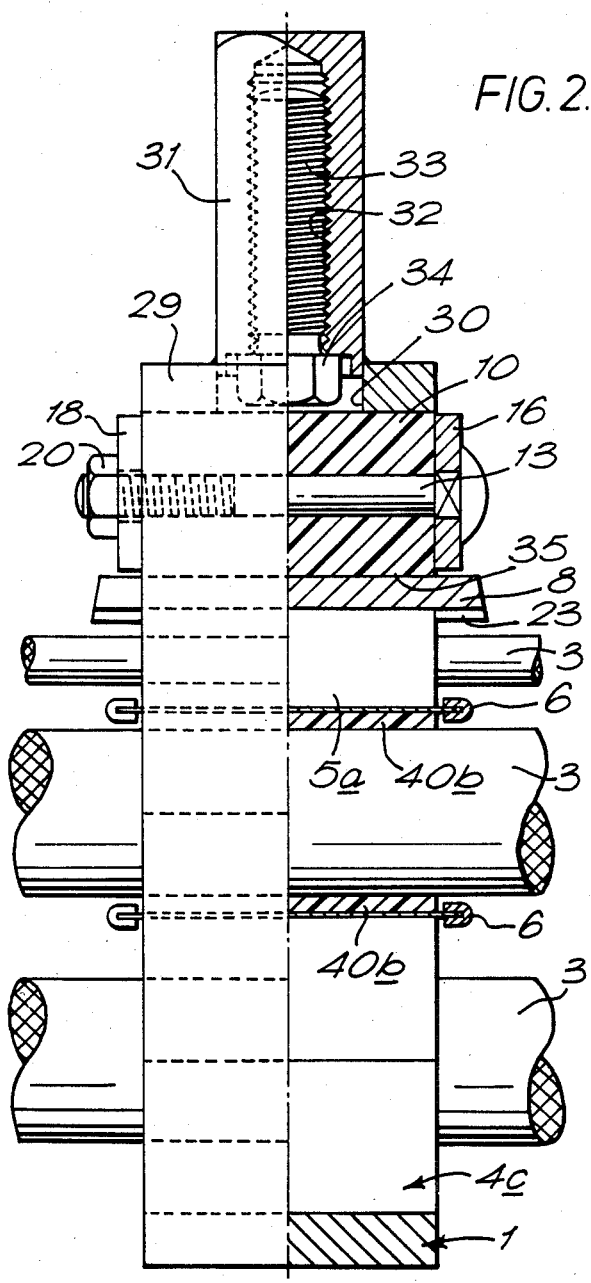
FIG. 2 is a partly sectioned side view of the cable transit shown in FIG. 1.
Figure 10:
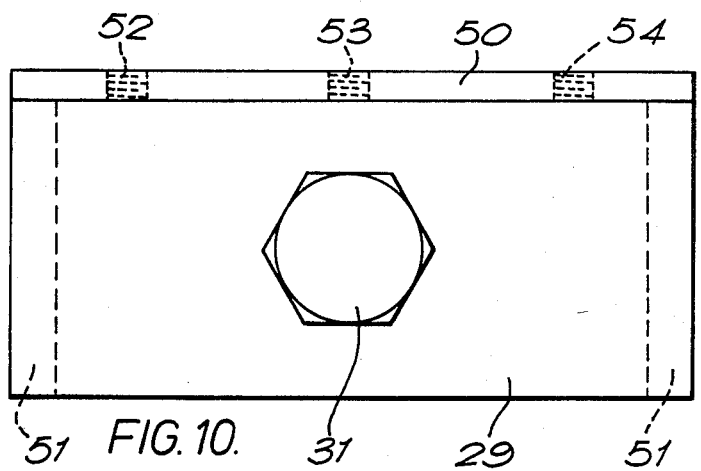
FIG. 10 is a top plan view of the frame shown in FIG. 8.
Figure 9:
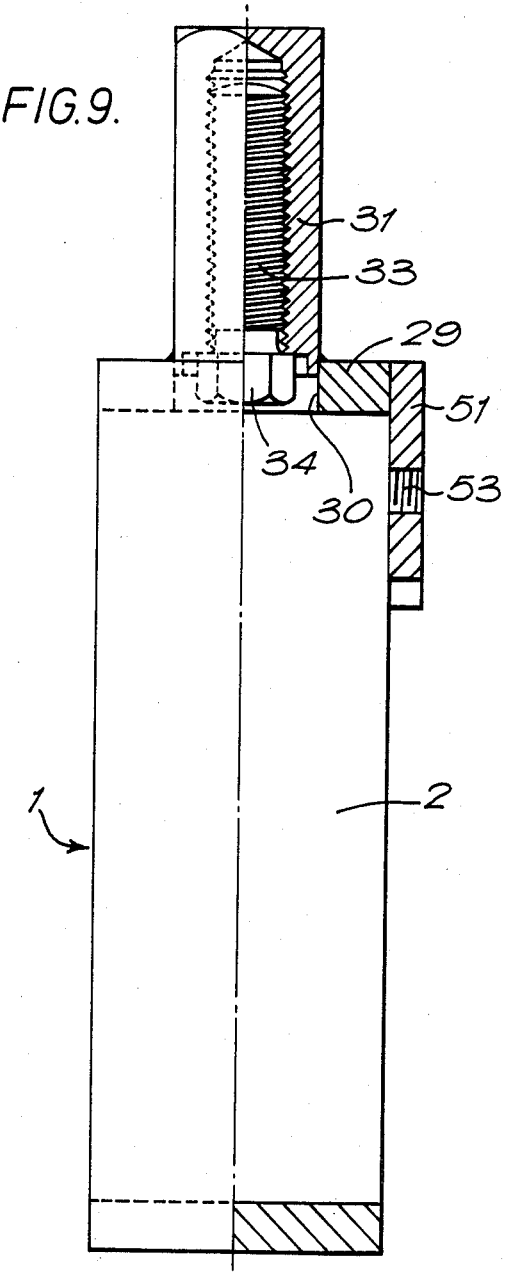
FIG. 9 is a side view of the frame shown in FIG. 8.

With reference to the general views of the complete cable transit as shown in the drawings of FIGS. 1,2 and 10, the improved cable transit comprises a rectangular frame 1 defining an opening 2 through which cables 3 of different sizes extend. In known manner, each cable 3 is held within a lead-through block 4 whilst solid blank blocks 5 fill the modular spaces of the opening where no cable is present. Each lead-through block 4 comprises two complementary half-blocks 40 which have semi-cylindrical recesses that define a passageway or lead-through for the cable 3. The frame is for mounting or support in an aperture in a bulkhead or partition or the like (not shown) and the numbers and sizes of cables may vary from one installation to another. For simplicity of explanation of this invention, only a small number of cables are depicted and the assembly is not as complex as found in practice where tens of cables may have to be accommodated and installed at the site location.

In this embodiment, there is depicted three series of sized sets of modular blocks 4 and 5 of which each size is designated by the suffixes a, b and c. Each series set has a common length corresponding substantially to the depth of the opening 2 and the frame 1. Each series set has blocks of substantially square section with the respective width and height dimensions of each set being selected to a common multiple so that a plurality of blocks of each set will complete a row or fill a modular space within the frame. Typical suitable modular dimensions are 90 mm, 60 mm and 30 mm for the square section blocks.

Each set of modular blocks is assembled in a row and to separate and support the assembled rows, stay plates 6 extend therebetween to locate on the marginal edges of the side walls of the frame 1.

In addition, the opening 2 is closed by a compression and packer assembly 7 which is for clamping and holding the rows of modular blocks in place and applies pressure to the modular blocks to seal these both to the cables 3, to each other, to the inner faces of the frame 1 and to the stay plates 6.

Figure 3:
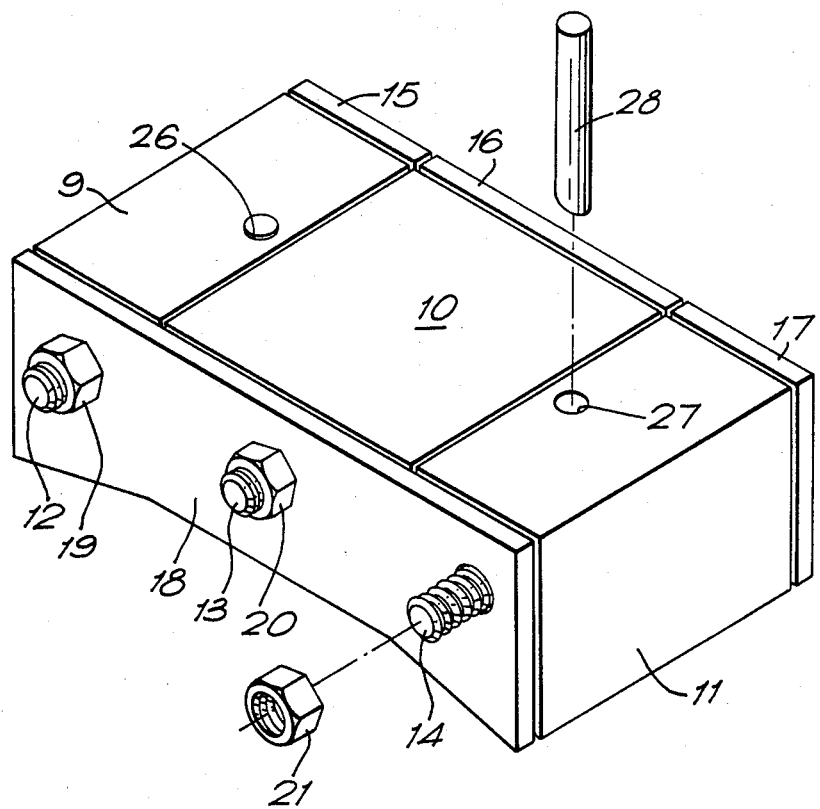
FIG. 3 is an isometric detail view showing the packer blocks, support plates and distance member of the compression and packer assembly.
Figure 4:
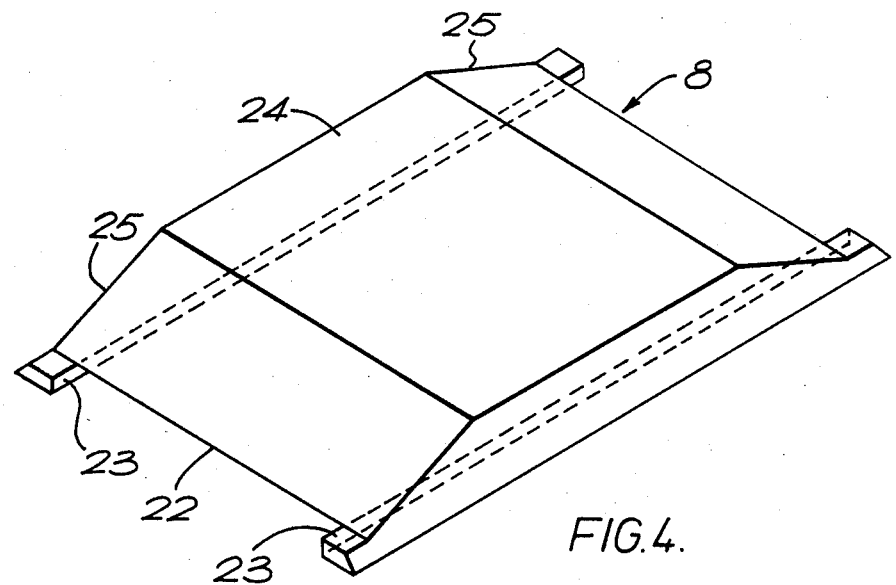
FIG. 4 is an isometric detail view of the plate of the compression and packer assembly.

With reference also to FIGS. 3 and 4, the compression and packer assembly 7 comprises a pressure plate 8, three packer blocks 9,10 and 11 each having a respective compressor stud 12,13 and 14 extending therethrough. Each packer block 9,10 and 11 has a respective rear support plate 15,16 and 17 against which the rear head of each respective stud 12,13 and 14 engages. Each stud 12,13 and 14 extends through the respective block and through aligned openings in a front support plate 18 with respective nuts 19,20 and 21 being in threaded engagement with the free end of the associated stud projecting through the front support plate 18.

The pressure plate 8 is a rigid body having a planar underside 22 for engagement with the upper faces of the top row of blocks 4a and 5a, and an edge flange 23 on each side of the plate 8 provides location ledges overlying the upper marginal edges of the blocks as well as providing outer end lug portions that extend outwardly and engage the outer faces of the sides of the frame 1. The topside of the plate 8 has a flat central portion 24 and opposed inclined portions 25.

Each of the packer blocks 9,10 and 11 are made of a resilient material and the outer blocks 9 and 11 have respective through holes 26,27 that extend transverse and spaced from the respective axes of the compression studs 12 and 14. A distance member in the form of a limit pin 28 is mounted in each through hole 26,27, and as shown in FIGS. 6 and 10, this pin 28 is arranged to engage the inner face of the upper end wall 29 of the frame 1 and the inclined portion of the pressure plate 8 so as to limit the degree of deformation of the blocks 9 and 11 when a reactive load is applied to the blocks in the direction of the axis of the limit pins as later explained.

The upper end wall 29 of the frame 1 is provided with a central clearance hole 30. A hexagonal shaped boss 31 is rigidly mounted on the wall 29 and projects therefrom aligned with the clearance hole 30. The boss has an internal blind threaded bore 32 and a compression bolt 33 is in threaded engagement within the bore 32 with the head 34 of the bolt 33 being accessible through the clearance hole 30 for rotation by a suitable tool. As should be appreciated, the bolt 33 can be unthreaded to extend into the void below the boss 31 when the central packer block 10 is not fitted, and the head 34 of the bolt will engage with the central portion 24 of the plate 8.

The packer blocks 9 and 11 are similar and have inner side faces that lie adjacent to the opposed side faces of the central packer block 10. The side faces of all the packer blocks 9,10 and 11 as shown in FIG. 3 are parallel to each other and normal to their top or upper faces remote from the plate 8. The central packer block 10 has a flat underside face 35 engaging the flat central portion 24 of the plate 8. The underside faces of the packer blocks 9 and 11 are inclined relative to the upper or top faces and are complementary to the respective inclined portions 25 of the plate 8.

The cable transit as aforedescribed with reference to the first arrangement of the packer blocks as shown in FIG. 5 is assembled from the individual components by a fitter in the manner now to be described.

Firstly, the frame 1 is located in the structure with the runs of cables 3 extending through the opening 2 of the frame 1. The fitter is presumed to have the selection of modular lead-through blocks 4 for each cable and a number of blanking blocks 5.

As depicted in FIG. 1, the largest lead-through blocks 4c are used in the lower row, and firstly the lower half-blocks 40c are set against the bottom inner wall of the frame 1 and the respective cables 3 are seated in the semi-cylindrical recesses in the half-blocks 40c and the upper half-blocks 40c are then seated on top to form the lead-through blocks 4 closing over the cables 3. The stay plate 6 is then inserted in place on top of this lower row of blocks with the marginal flanged edges of the stay plate 6 riding over the side edges of the frame 1 to locate the stay plate 6 in a similar manner as for the pressure plate 8. Preferably, the stay plate has a central web portion which is pierced or of mesh to prevent high rates of heat transfer from one side to the other of the cable transit when installed.

The fitter then selects the next cables 3 to be located in the lead-through blocks 4b for the next row and this row includes a solid blanking block 5b. The assembly is as for the first row, and when the blocks 4b and block 5b are assembled another stay plate 6 is located over the row of blocks.

The third row of blocks 4a, and 5a is then assembled in a similar manner, and all of the cable runs are enclosed by the selected lead-through blocks 4 and modular spaces are filled by the solid blocks 5a. The lower portion of the frame opening is filled by the rows of blocks and stay plates 6.

Once this assembly has been completed by the fitter, it is then necessary to apply pressure to the assembled blocks and cables to clamp and seal the blocks together as well as to seal such sized lead-through blocks to the cable. In addition, the remainder of the opening in the frame 1 must be closed or filled. This next stage to complete the assembly is by the component parts of the compression and packer assembly.

The pressure plate 8 is located over the third row of blocks and seated over the assembled array of blocks and cables. Due to the resilient nature of the blocks and the effect of the cables, pressure must be applied to the assembled blocks to compress the blocks around the cables to seal the lead-through blocks both around the cable and to clamp them together and against the side walls of the frame 1 and to the stay plates 6.

To apply this pressure, the compression bolt 33 is rotated to bring the head 34 into engagement with the flat central portion 24 of the plate 8 and on further rotation of the head 34 compressive forces are applied through the plate 8 to the assembled blocks.

Once the compressive load applied to the plate 8 is sufficient to leave a clearance space between the pressure plate 8 and the inner face of the top frame wall 29, the fitter can insert an outer packer block 9 or 11 in the clearance space clear of the compression bolt which only extends to the centre of the clearance space and does not interfere with the fitting of either of the two side blocks 9 and 11.

Following the insertion of one or both of the two side packer blocks 9 and 11, the compression bolt 33 can be counter-rotated to return the bolt into the bore of the boss 31 leaving the central area over the pressure plate 8 free for insertion of the central packer block 10 between the two side blocks 9 and 11. The assembly of the rows of blocks and cables will continue to exert reactive forces on the pressure plate 8 tending to displace it towards the top wall of the frame, and thus tending to compress the blocks 9 and 11. To obviate the affect of these reactive forces, the limit pins 28 of defined length mounted in the packer blocks 9 and 11 restrict squeezing of the packer blocks because the opposed ends of the pins 28 will abut the rigid surfaces of the plate 8 and the end wall 29.

Once the three packer blocks 9,10 and 11 are received within the clearance, the front support plate 18 can be engaged over the free ends of each of the compressor studs 12,13 and 14 and the respective nuts 19,20 and 21 placed in threaded engagement. The fitter then tightens each of the nuts 19,20 and 21 to apply compressive forces to the compression blocks so that the three blocks are brought into clamping engagement with each other and brought into engagement with the support plate 18. On tightening of the nuts, each of the packer blocks 9,10 and 11 is squeezed so as to cause resilient displacement of the block material in a direction transverse to the axis of each compressor stud thereby expanding the assembly both to fill the clearance opening between the pressure plate 8 and the frame 1 and to exert the required clamping pressure onto the assembly of blocks and cables beneath the pressure plate 8.

Accordingly, the compression and packer assembly 7 completes the filling of the opening 2 in the frame 1 whilst also applying the necessary forces to the assembled rows of blocks and cables to ensure that the whole assembly is sealed together and securely located against displacement. The forces applied to the assembled rows of the lead-through and blank blocks are sufficient to ensure each lead-through block is in clamping and sealing engagement with the cable.

As will be appreciated from the foregoing description of the manner of fitting the component parts of the compression and packer assembly 7, the fitter can fit all of the parts together from the front of the frame where access to the rear of the frame is precluded as often happens when the frame is fitted in a closed bulkhead. The over-loading of the packing blocks by reactive forces applied by the natural resilience of the modular blocks and the cables is limited by the limit pins, and the limit pins do not interfere with the expansion of the packer blocks 9,11 when the compressor bolts are tightened.

With reference now to the alternative form of the packer blocks as depicted in FIG. 5, it should be noted that the outer blocks 9 and 11 each have inner side faces 9a,11a that are not normal to the upper or top face of the respective blocks. The inner side faces 9a,11a are inclined or tapered towards the rear support plates as well as being divergent from the upper or top faces so as to have a wedge-like inner form. Each side face 10a of the central packer block has complementary inclined and taper faces which diverge towards the rear support plate 16.

In this alternative form of the packer blocks, the assembly of the compression and packer component parts may proceed as just described for the arrangement depicted in FIG. 3 if there is access to both sides of the transit frame. If the access is limited to the front, then the fitter would insert one of the side packer blocks 9 or 11 first, then insert the central packer block 10 and lastly insert the other side packer block which, with it's wedge-like shape is presented with it's smaller end to the space left for insertion and can be easily inserted and slid into place. Once the support plate 18 is located over the free ends of the compressor studs 12,13 and 14, the tightening of the respective nuts 19,18 and 21 can proceed as previously described to bring the three packer blocks into tight abutting engagement with the compressive loads being distributed uniformly through the abutting inclined and tapered side faces of the three packer blocks.

Figure 11:
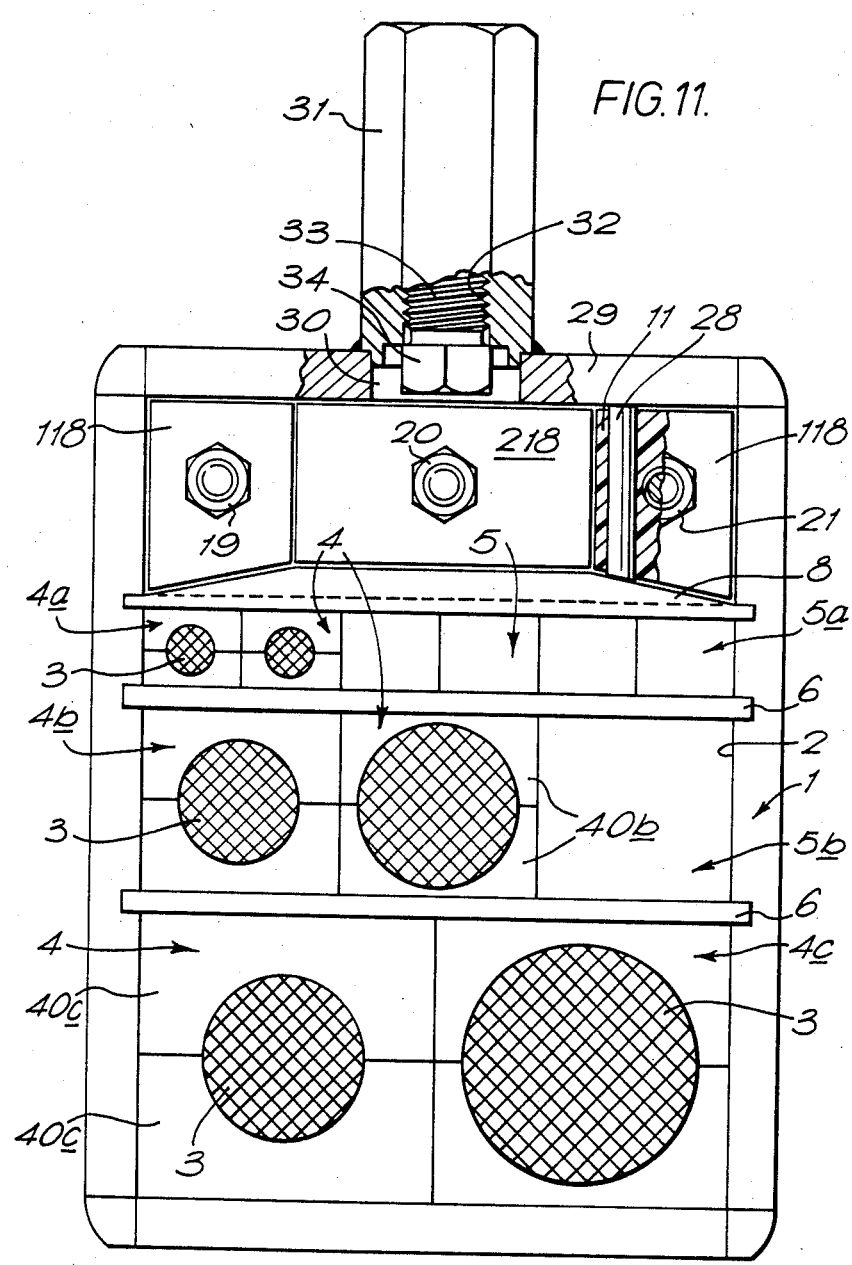
FIG. 11 is a front elevation of a cable transit similar to that shown in FIG. 1 but in which the support plates for the packer blocks are different and in which a detail section of the distance member is depicted.

As various installations and requirements arise in practice, it will be understood that although the two alternative forms of packer blocks and support plates as just described are suitable for some applications, it is also possible for each packer block to have an independent support plate both at the rear and front. Such an alternative is depicted in FIG. 11 where the front support plate comprises three separate plates respectively referenced as plate 118 for the outer packer blocks, and as plate 218 for the central packer block.

Although all of the alternatives as have been described include one or more support plates for the packer blocks which are separate from the frame, an alternative is shown in FIGS. 7,8,9 and 10 to which reference will now be made and wherein the same references as used for similar parts as previously described.

The frame 1 has a support plate 50 rigidly secured to the side walls 51 and the end wall 29 so as to extend across the rear face of the upper portion of the frame 1. The support plate is provided with three through bores 52,53 and 54. These bores may have a square section so as to receive a respective squareshank of a compressor stud to locate the stud against relative rotation when a nut on the stud is screwed thereon.

The packer blocks 9,10 and 11 as shown in FIG. 7 are each formed with through bores of which one 10c is shown in dashed lines, and each of the bores provide through passageways for the respective compressor studs of which the free ends are to project through aligned holes in the front support plate 18, and in the same manner as previously described, a nut would be mounted on the free end of each stud to compress the packer blocks to the desired degree when the assembly was completed.

The studs could be rigidly fixed to project from the rear support plate, or the bores 52,53 and 54 could be internally threaded with the compressor studs being fully threaded along their shanks. Preferably, with a fixed support plate 50, the bores therethrough are threaded and the compressor studs are entered through the front of the packer blocks and any associated front support plate(s) overlying the packer blocks. All of these possibilities are capable of performance with the improved form of compression and packer assembly.

It should also be noted that the packer blocks as shown in FIG. 7 include another important variation. In these packer blocks, the side blocks 9 and 11 have respective inner side faces 9b and 11b which are both tapering inwardly in the direction of the forward end shown nearest to the support plate 18, and in addition, these faces are inclined inwardly towards the central packer block 10 so that each side packer block is of wedge-like shape being smaller at the forward end. The central block 10 has complementary inclined side faces 10b and the central block is thus of wedge-like shape with the smaller end of the wedge being inwards.

Accordingly, with this arrangement of packer blocks, each of the side packer blocks 9 and 11 can be fitted into the clearance space between the plate 8 whilst the compression bolt is engaged with the plate 8. Once the compression bolt 8 has been displaced back into the boss 31, then the central packer block 10 can be presented with the smaller end first and slid into place with the compressor stud extending through the bore 10c.

Other combinations of the component parts of the compression and packer assemblies as just described are feasible, and it is assumed that these will be appreciated by those skilled in this field.

Other alternatives within the scope of this invention include the provision of distance members which are not limit pins disposed within bores or holes through a packer block.

It is envisaged that the support plates associated with at least one packer block could be sized and designed for abutment with the pressure plate and the frame so as to provide the necessary limit to compression of the packer block when the load applied by the compression bolt is relieved. Alternatively, separate short plates like spacers could be provided for interim temporary placement between the plate and inner wall of the frame.

In the preferred embodiments of this invention as described and illustrated, there have been three packer blocks with respective compressor studs and support plates. It is possible to apply the principles explained herein to only two packer blocks if one packer block is larger than the other so that the smaller packer block is fitted first and after relieving the pressure exerted by the compression bolt on the plate, then the second larger packer block could be inserted in the remaining clearance space to be filled. Following the same principle, it is possible to have more than three packer blocks, and depending on the way in which these are arranged, it is possible to have one or more of these also with wedge-like shape to facilitate fitting and distributing loading over wedge faces.

As will be understood, the fitting of the cable transit arises in various environments, and the cable transit may be installed as described in the vertical position, but it may be installed horizontally where safe retention and ease of assembly of the blocks and other component parts is required.

The exemplary embodiments described are simplified for an understanding of this invention, and the numbers and relative dimensions of the blocks may be varied whilst maintaining the principles of modular sizes, and of course in known manner, more than one block may fill a modular space, for instance four small blocks as shown in row a may fill a modular space in row c.

The resilient material of which the lead-through and blanking blocks as well as the packer blocks are made can be of any suitable material which is flame-resistant, fire-resistant, water-resistant and resistant to effects of rodent attack, ageing, and temperature variations.

Throughout this description, reference has been made to cables as this is the commonest form of use of transits through bulkheads, partitions or the like. However, the invented cable transit can be used and applied to pipes or conduits and the term "cable" is not intended to be a limitation to the application and use of the invention nor is the use of the term "cable" to be interpreted as a limitation to the scope of this invention.

We claim:

1. A lead-through transit of the kind comprising a rectangular metal frame defining an opening through which cables or pipes extend, a series of sets of modular blocks assembled in rows within said frame opening, said modular blocks surrounding each cable or blanking off a modular space, and a compression and packer assembly mounted in said frame opening and clamping the assembled modular blocks together and around each cable with the compression and packer assembly completing filling of said frame opening, the improvement being that said compression and packer assembly comprises:

a rigid plate located in said frame and applying pressure to the assembled array of said blocks and cables in a first direction which is in a plane transverse to the axes of said cables and substantially within opposed side walls of said frame between which rows of said modular blocks extend;

a compression bolt mounted in an end wall of said frame for threaded displacement in said first direction and temporarily engaging said plate to apply a load to said plate and said assembled array and temporarily clamping said modular blocks and cables together;

a plurality of packer blocks of resilient material including at least one first packer block inserted into a clearance space in said frame opening between said end wall and said plate and beside said compression bolt to partially fill said clearance space and at least one a second packer block which is inserted into said clearance space beside said at least one first packer block after said compression bolt is removed from said clearance space such that said packer blocks are seated beside each other between said side walls of said frame and completely filling said clearance space, each said packer block defining a respective through bore extending in a second direction substantially parallel to said axes of the cables, and a respective compressor stud extending through each said bore and applying compression to the associated packer block within the confines of said frame to maintain pressure on said plate and said assembled array of modular blocks and cables.

2. A transit according to claim 1 wherein said compression and packer assembly includes a distance member which is interposed between said end wall of said frame and said rigid plate to limit the reactive effect of said assembled modular blocks and cables on said rigid plate on displacement of said compression bolt away from said plate following insertion of said at least one first packer block.

3. A transit according to claim 2 wherein said distance member comprises a rigid member extending in said first direction to said at least one first packer block.

4. A transit according to claim 3 wherein said rigid member comprises a pin located within a bore formed in said at least one first packer block.

5. A transit according to claim 1 wherein there are three said packer blocks comprising a centrally located packer block and two outer packer blocks.

6. A transit according to claim 5 wherein said packer blocks have complementary abutting taper faces.

7. A transit according to claim 6 wherein said abutting taper faces of said packer blocks are inclined to said first direction.

8. A transit according to claim 1 wherein said rigid plate has a flat face abutting the adjacent row of modular blocks and the opposed face of said rigid plate has a conformation complementary to the adjacent faces of said packer blocks engaging therewith.

9. A transit according to claim 1 wherein said compression bolt is in threaded engagement with a boss rigidly mounted on said end wall of said frame with said frame having a clearance opening leading to a threaded bore in said boss into which said compression bolt can be displaced.

10. A transit according to claim 6 wherein said abutting taper faces of said packer blocks are inclined to said second direction.

11. A lead-through transit comprising a rectangular metal frame having opposed side walls and opposed end walls defining an opening, a rigid metal plate located in said opening and extending between said opposed side walls, a plurality of modular blocks located in and filling said opening on one side of said rigid plate, at least one of said modular blocks defining a passageway extending from front to back of said frame through which a cable extends, a plurality of packer blocks of resilient material including at least one first packer block and at least one second packer block located in and together filling said opening on the other side of said rigid plate, each said packer block extending from front to back of said frame and defining a through bore extending substantially parallel with the cable axis, a respective compression stud extending through each one of said bores and compressing the associated packer block to apply a load to said rigid plate and the modular blocks to clamp the modular blocks together and seal the cable, the transit further comprising a compression bolt mounted in one of said end walls adjacent to said packer blocks, said bolt being axially moved in a direction substantially normal to the cable axis in one sense and temporarily engaging said rigid plate to pre-load said rigid plate and said modular blocks whereby said at least one first packer block is inserted adjacent thereto and said bolt then being moved in the other sense from engagement with said rigid plate and clear of said frame opening whereby said at least one second packer block is inserted to complete filling of said frame opening with said packer blocks.

12. A lead-through transit comprising a rectangular metal frame defining an opening through which cables extend, a series of sets of modular blocks located in and partially filling said frame opening, said modular blocks surrounding each cable or blanking off a modular space, a rigid plate located in said frame opening between opposed side walls of said frame with said assembled modular blocks and cables abutting one side of said plate, a plurality of packer blocks of resilient material including at least one first packer block and at least one second packer block located in said frame opening between an end wall of said frame and the other side of said plate remote from said assembled modular blocks and cables which together complete filling of said frame opening, each said packer block extending between entry and exit sides of said frame opening and defining a respective through bore extending substantially parallel to the axes of the cables, a respective compressor stud extending through each said bore and applying compression to the associated packer block within the confines of said frame to clamp said assembled modular blocks together around said cables, and a compression bolt mounted in said end wall and axially movable in one sense and temporarily engaging said rigid plate to pre-load said assembled modular blocks and cables whereby said at least one first packer block is inserted adjacent thereto and said compression bolt then being movable in the other sense from engagement with said rigid plate and clear of said frame opening following which insertion of said at least one second packer block is made and completes filling of said frame opening with said packer blocks.

* * * * *